July 12, 1966  D. J. CRITCHELL  3,260,404

AUTOMATIC PARTS SUPPLY ARRANGEMENT

Filed Feb. 11, 1964

DEAN J. CRITCHELL
INVENTOR.

BY R. Frank Smith
David P. Ogden
ATTORNEYS

United States Patent Office 3,260,404
Patented July 12, 1966

3,260,404
AUTOMATIC PARTS SUPPLY ARRANGEMENT
Dean J. Critchell, Rochester, N.Y., assignor to Eastman Kodak Company, Rochester, N.Y., a corporation of New Jersey
Filed Feb. 11, 1964, Ser. No. 344,152
10 Claims. (Cl. 221—13)

This invention relates to an automatic parts supply arrangement and more particularly to an arrangement for selectively presenting individual parts, one at a time, at a selected location.

In the art of parts supply apparatus, numerous embodiments have been developed utilizing various types of conveyor mechanisms and various types of arrangements for separating a part from a conveyor when the part is adjacent to a specific location. Most of these supply arrangements use a conveyor of limited length and limited storage capacity thereby resulting in inventory limitations which are sometimes destructive of the general purpose of such apparatus. For instance, if the conveyor means simply conveys a part from a finishing machine to an assembly location the supply of parts on the conveyor is terminated by a breakdown of the finishing machine. Thus, any breakdown or stoppage thereof soon will prevent operation of an assembler.

However, some part delivery apparatus are arranged to store a plurality of parts in a convenient container which container may be moved from place to place or itself placed in inventory whereby the supply of parts is not so directly related to the continued successful operation of a finishing machine. My invention is useful in this latter type of component delivery arrangement. Even in these more convenient systems, many prior art equipments support each of the individual components in a manner which makes the separation of the component from its vehicle of support a relatively complex operation. Such increases in complexity increase the cycle time and the likelihood of damage to the part at the time it is separated. Furthermore, the omission of a part from its normal sequential location will often result in additional time and motion to attain a next part. As a further problem many finished parts are provided with surfaces having paint and other damageable surfaces, whereby these surfaces need to be completely covered to provide maximum protection thereto. Moreover, another surface of such a component or part may be provided with a thermosetting or other type of glue which requires protection to prevent its sticking to adjacent surfaces resulting in additional loss of time and often damage to the stuck part or parts.

Therefore, an object of the present invention is to provide an automatic parts supply arrangement which protects all surfaces of the parts in inventory and will automatically present a part as required by an assembler.

In accordance with one embodiment of my invention a succession of parts are stored within a pouched plastic web so that all surfaces are protected by the web and no part is able to touch another part to cause mutual damage. The web is drawn through the parts supply arrangement to an ejecting station where an air jet means is permanently located and positioned so that it will remain within a rear portion of the pouched web whereby detection of a part results in energization of the air jet to blow the part out through the open portion of the pouch.

The subject matter which is regarded in my invention is particularly pointed out and distinctly claimed in the concluding portion of the specification. The invention, however, as to its organization and operation together with further objects and advantages thereof will best be understood by reference to the following description taken in connection with the accompanying drawing in which:

Figure 1:
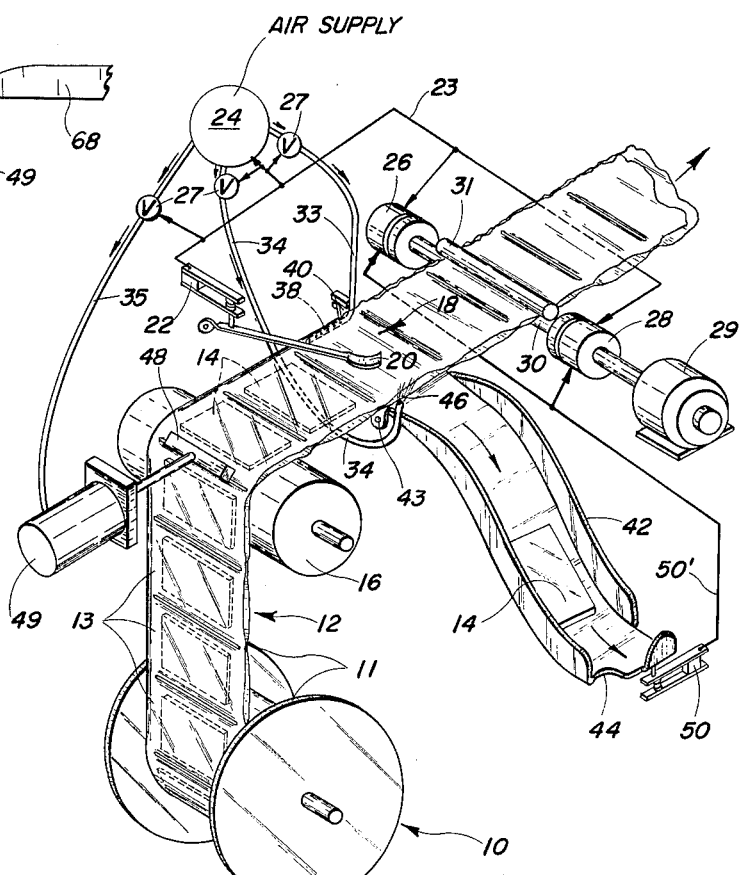
FIG. 1 is a simplified perspective view of one embodiment of my invention.

Referring now to the drawing wherein like numbers refer to similar parts, I have shown in FIG. 1 a supply reel 10 having large flanges 11 to maintain thereon a coil of a pouched web 12 with individual pouches 13 thereof, each containing a part 14. It should be noted that each of the pouches 13 is open at the near side as shown in FIG. 1, whereby each of the parts 14 may be ejected therefrom without slitting of this side of the web 12.

As the web 12 is drawn from the supply reel 10, it passes over a guide surface of a large diameter roller 16 and travels to an ejection station 18. At the ejecting station is located a part detector mechanism 20 which operates a switch 22 to energize a signal line 23 to initiate operation of an air supply means 24 and a brake means 26 and to disconnect a clutch means 28. As indicated at 27, the operation of the air supply means 24 may be accomplished by magnetic valves. Both the brake means 26 and the clutch means 28 may be designed in the manner of the now well-known magnetic clutches. During the driving of the web 12, the brake means 26 is de-energized and the clutch means 28 is operable by a motor 29 to draw the pouched web 12 through the ejection station 18 via a drive roller 30 and a back-up roller 31. Thus the detection of a part 14 by the feeler 20 stops the pouched web 12 by energizing the brake 26 and unloads the motor 29 by de-energizing the clutch 28 whereby the rollers 30 and 31 are locked in that position. Removal of a part from the region of the feeler 20 terminates operation of the various air jets discussed herein.

At the same time the part is detected, the air supply means 24 supplies air through a plurality of ducts or conduits 33, 34, and 35. The conduit 33, is coupled to an air jet nozzle 38 which is maintained within the rear portion of the pouched web 12 by a slitter means such as a razor blade or knife edge 40. Air passing through ports of the nozzle 38 impinges upon the rear of the detected part 14 and ejects it to a take-off tray 42 pivotably mounted at 43. Once on the take-off tray 42, the part moves to a take-off position with take-off being facilitated by a notch 44. The particular take-off tray illustrated is sloping to further enhance movement of the part to the take-off notch 44. Further agitation of the pouch 13 in the ejection station 18 is accomplisehd by an air jet 46 which receives air from the air supply means 24 through the conduit 34.

The release of any parts 14 which tend to be entrapped in the pouches 13 is further enhanced by a tension release bar 48 energized by an air cylinder 49 to compress the pouched web 12 against the roller 16. The air pressure within the conduit 35 supplies sufficient stroke so that the tension release bar 48 moves the pouched web 12 slightly toward the stopped rollers 30 and 31 whereby tension in the web is substantially eliminated and the air jets will greatly agitate both the pouch 13 and the part 14 in the ejection station 18.

Removal of parts from the take-off tray 42 is arranged to initiate operation of the rollers 30 and 31. Detection of such removal may be easily accomplished by photocells and the like responsive to the presence of a pick up instrument such as an operator's hand. However, I prefer to use a somewhat simpler pressure switch 50 coupled by a signal line 50′ to de-energize the brake 26 and energize the clutch 28. Thus the cycle discussed above is automatically repeated as soon as a part is removed.

Figure 2:
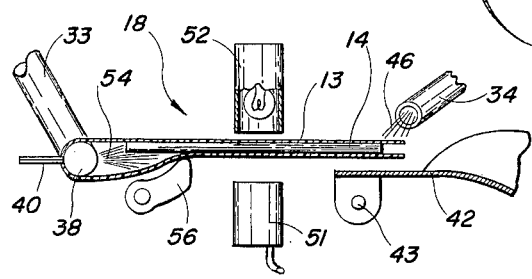
FIG. 2 is a detailed cross section view of the ejection station showing one embodiment thereof.

Referring now to FIG. 2, I have shown in greater detail one embodiment of the ejection station 18 wherein the feeler 20 has been replaced by a photodetector 51 energized by a light 52 when a part is not present. Thus when the signal from the photodetector 51 is prevented by the presence of a part 14, the air supply 24 is energized as is the brake means 26 and the clutch means 28 is de-energized. Energization of the air supply 24 supplies air to the conduit 33 and produces a jet 54 flowing from the nozzle 38 against the part 14 within the pouch 13. The particular part illustrated in FIGS. 1 and 2 is a relatively thin part as might be used for a face plate or name plate of a machine or mechanism and is provided on the lower surface thereof with a thermoplastic glue which tends to adhere to various surfaces including the surface of a polyethylene pouch 13. Thus I have provided a finger 56 which raises the part 14 slightly relative to the nozzle 38 so the air jet 54 hits the lower surface of the part and the lower portion of the pouch 13 as well as the end of the part to facilitate separation of the part 14 from the pouch 13. Such an arrangement is particularly useful when the lower portion of the part 14 has a glued surface. Thus even though the parts may rather tightly adhere to the web during an extended stay in inventory on the reel 10 they will be automatically and rapidly separated.

Referring now to FIG. 3 I have again shown the ejection station 18 with a slightly different part 14′ being ejected. The part 14′ is substantially thicker than the part 14 and is embossed or raised so that most of the glued surface thereof does not tend to engage the lower portion of the pouch 13. The added thickness of the part 14′ enhances separation without the use of the finger 56 as illustrated in FIG. 2, partially because of nonadherence and partially because of a substantially increase work surface for the jet 54.

Figure 3:
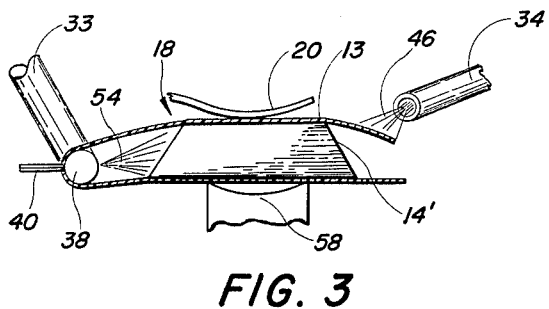
FIG. 3 is a detailed cross section view of the ejection station showing another embodiment thereof.

Also in FIG. 3, the feeler 20 is illustrated as arcuate whereby in the de-energized position it resides in mating arcuate stationary member 58 so that the passage of a part therebetween separates the feeler 20 from its support 58 by a substantial amount to assure an adequate movement to operate the switch 22.

Figure 4:
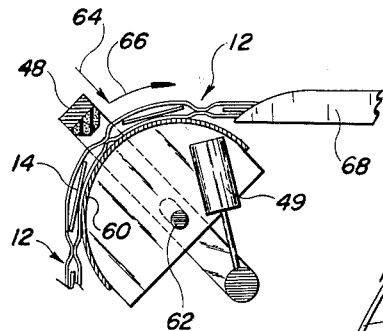
FIG. 4 is an elevation cross section view showing the details of a tension relief mechanism illustrated in FIG. 1.

As might be expected, the diameter of the roller 16 is functionally related to the breadth and rigidity of a part being passed thereover. Instead of using extremely large diameter rollers, I prefer an arcuate surface as indicated at 60 in FIG. 4. When using such a surface, space under it may be used to house the air cylinder 49. As illustrated in FIG. 4, the tension release bar 48 may be both slidingly and pivotally supported on a shaft 62 on the underside of the surface member 60. Thus, the air cylinder 49 moves the release bar against the pouched web 12 as indicated by an arrow 64 and then moves it toward the ejection station 18 as indicated by an arrow 66. Also illustrated in FIG. 4 is an end guide member 68 that will prevent loss of parts from the slack pouches 13 between the tension release bar 48 and the ejection station 18.

While I have shown and described particular embodiments of the present invention, other modifications may occur to those skilled in this art. I intend, therefore, to have the appended claims cover all modifications which fall within the true spirit and scope of my invention.

I claim:
1. An automatic parts supply arrangement for presenting similar parts from within a pouched supply web, comprising:
   means for advancing the supply web;
   an air jet nozzle;
   means for maintaining the air jet nozzle within the supply web;
   means for sensing a part within a pouch of the supply web; and
   means responsive to said sensing means for actuating said air jet nozzle to eject the sensed part.

2. An automatic parts supply arrangement as in claim 1 wherein said air jet nozzle maintaining means includes a cutting member to slit a rear portion of the pouched supply web whereby said air jet nozzle is maintained in a rearmost portion of each pouch and the part is ejected from the front opening of the pouch.

3. An automatic parts supply arrangement as in claim 1 having:
   a forward chute receptive of each part ejected from the supply web;
   means responsive to said sensing means to stop the advance of the supply web; and
   means responsive to the removal of a part from said chute for restarting the advance of the supply web.

4. An automatic parts supply arrangement as in claim 3 wherein said chute is downwardly sloping so that an ejecting part moves to the end thereof.

5. An automatic parts supply arrangement for presenting similar parts from within a pouched supply web storable on a flanged reel, comprising:
   roller means for intermittently pulling the supply web from the reel to advance it and present a pouch containing a part to an ejection station;
   slitter means positioned at the ejection station to intercept a rear portion of the supply web remote from the opening of the pouches thereof;
   an air supply tube coupled to said slitter means to reside at the rear of each pouch as the supply web is advanced to the ejection station;
   means at the ejection station for sensing the presence of a part within a pouch;
   clutch means responsive to a signal of said sensing means to stop the advance of the supply web when a part is sensed; and
   valve means operable to supply air to said air tube when the supply web is stopped.

6. An automatic parts supply arrangement as in claim 5 wherein said sensing means includes a feeler arm operatively coupled to a switch means; and
   said valve means is responsive to the switch means.

7. An automatic parts supply arrangement as in claim 6 having:
   another air jet arranged to agitate the forward opening of each pouch at the ejection station; and
   means co-operating with said roller means to relieve tension in the portion of the supply web at the ejection station.

8. An auotmatic parts supply arrangement for presenting similar parts from within a pouched supply web storable on a flanged reel, comprising:
   roller means for intermittently pulling the supply web from the reel to advance it over a guide surface and present a pouch containing a part to an ejection station;
   slitter means positioned at the ejection station to intercept a rear portion of the supply web remote from the opening of the pouches thereof;
   a first air supply tube coupled to a nozzle secured to said slitter means to reside at the rear of each pouch as the supply web is advanced;
   a second air supply tube positioned to direct an air jet over the forward portion of each pouch within the ejection station;

means at the ejection station for sensing the presence of a part within a pouch;

clutch means responsive to a signal of said sensing means to stop said roller means when a part is sensed; and valve means operable to supply air to said air tubes when the supply web is stopped.

9. An automatic parts supply arrangement as in claim 8 wherein said sensing means includes a photodetector means; and said valve means is responsive to the photodetector.

10. An automatic parts supply arrangement as in claim 9 having;

another air supply tube coupled to an air cylinder for driving a tension relief bar against and over the guide surface when said roller means is stopped to thereby develop slack in the pouch at the ejection station.

References Cited by the Examiner

UNITED STATES PATENTS

| | | | |
|---|---|---|---|
| 383,911 | 6/1888 | Raymond | 221—71 |
| 3,040,727 | 6/1962 | Edwards et al. | 221—278 X |
| 3,067,911 | 12/1962 | Finley et al. | 221—11 X |

LOUIS J. DEMBO, *Primary Examiner.*

K. LEIMER, *Assistant Examiner.*